United States Patent
Hsu

(10) Patent No.: US 6,637,663 B2
(45) Date of Patent: Oct. 28, 2003

(54) SCANNING APPARATUS WITH THE APPEARANCE OF PEN

(75) Inventor: Hsiu-O Hsu, Hsinchu (TW)

(73) Assignee: Umax Data Systems Inc. (TW)

( * ) Notice: Subject to any disclaimer, the term of this patent is extended or adjusted under 35 U.S.C. 154(b) by 0 days.

(21) Appl. No.: 10/119,045

(22) Filed: Apr. 10, 2002

(65) Prior Publication Data

US 2002/0158135 A1 Oct. 31, 2002

(30) Foreign Application Priority Data

Apr. 27, 2001 (TW) .................................... 090110224

(51) Int. Cl.$^7$ ................................................ G06K 07/00
(52) U.S. Cl. ......................... 235/472.01; 235/462.01; 250/227.13; 382/312; 382/313
(58) Field of Search ................... 235/472.01–472.03, 235/462.01–462.45, 375, 494, 454, 455; 382/312, 313, 314, 315, 316, 317; 250/227.13

(56) References Cited

U.S. PATENT DOCUMENTS

| | | | | |
|---|---|---|---|---|
| 5,604,640 A | * | 2/1997 | Zipf et al. | ................. 359/803 |
| 5,821,524 A | * | 10/1998 | Horlbeck et al. | ............ 235/483 |
| 5,969,324 A | * | 10/1999 | Reber et al. | ............ 235/462.13 |
| 6,081,827 A | * | 6/2000 | Reber et al. | ................. 709/200 |
| 6,138,151 A | * | 10/2000 | Reber et al. | ................. 709/219 |
| 6,238,043 B1 | * | 5/2001 | Silverbrook | ................. 347/86 |
| 6,249,765 B1 | * | 6/2001 | Adler et al. | ................. 704/500 |
| 6,342,901 B1 | * | 1/2002 | Adler et al. | ................. 345/700 |
| 6,390,370 B1 | * | 5/2002 | Plesko | ................... 235/462.49 |

* cited by examiner

Primary Examiner—Thien M. Le
(74) Attorney, Agent, or Firm—Rabin & Berdo, PC

(57) ABSTRACT

A scanning apparatus with the appearance of a pen for scanning a small-sized document has the casing, the cap, the input slot and the output slot for inputting and outputting the small-sized document on the casing, respectively, the transmission apparatus for driving the small-sized document, the light source for emitting the light, the photoelectric sensing device for receiving a light signal reflected by the small-sized document and then outputting a digital data of captured image to the control processing unit. The scanning apparatus also has 1394 interface connector or USB (Universal Serial Bus) connector to transmit the digital data stored in the control processing unit to the terminal operating system such as the computer, the Personal Digital Assistant (PDA), or the cellular phone for editing or printing. The scanning apparatus of the invention is easy to carry and can be operated anywhere and anytime.

19 Claims, 4 Drawing Sheets

SCANNING APPARATUS WITH THE APPEARANCE OF PEN

This application incorporates by reference Taiwanese application Serial No. 90110224. Filed on Apr. 27, 2001.

BACKGROUND OF THE INVENTION

1. Field of the Invention

The invention relates in general to a scanning apparatus, and more particularly to the scanning apparatus with the appearance of a pen for scanning a small-sized document.

2. Description of the Related Art

In the Age of information avalanche, the interaction between people is becoming more and more frequent. People are striving for the efficiency of the information exchange and business affair. For benefiting the business cooperation, it is important to make a deep impression on each other when people first meet. Generally, business people routinely exchange their business cards for introducing themselves and providing relevant information, such as a telephone number, a fax number, an address, an E-mail address, or the like, thereby promoting business contacts and communications. Since these business cards are distributed routinely, a large number of business cards are accumulated over a relatively short period of time. It is not easy to put the large number of business cards in order and is time-consuming to look for the specific one therein. Also, the cards being thrown away or lost indirectly cause the environmental pollution and the waste of resources.

With the thriving development of the computer multimedia, the scanning apparatus for capturing the image recently plays an important role in the daily life. The important information of the documents and the business cards, or the image on the photos and the pictures, can be scanned and stored in the scanner apparatus. The image can be further transformed to digital data so that the data can be easily sorted, manipulated, and transferred by the users. However, the common scanners, such as flatbed scanners, are large and bulky, thus not easy to carry and operate. Accordingly, the scanning apparatus for scanning, the small-sized documents, especially the business card, are designed for satisfying the demand of the market.

For the manufacturers of producing the scanning apparatus capable of scanning the small-sized documents, the major researching directions include power saving, low cost, easy to use, and portability. Although the business card scanners sold in the market are smaller than the conventional scanners, and almost as large as the Personal Digital Assistant (PDA), the business card scanners are twice to triple as thick as the PDA, and the overall size is still too bulky and not easy to carry.

SUMMARY OF THE INVENTION

It is therefore an object of the invention to provide a scanning apparatus with the appearance of a pen for scanning a small-sized document, business card especially. Integration of the scanning associated devices into the shape of pen could make the scanning apparatus easy to carry and operate anywhere and anytime.

According to the objective of the invention, the scanning apparatus with the appearance of a pen for scanning a small-sized document has a casing and a cap. On the casing, an input slot and an output slot are designed for inputting and outputting the small-sized document, respectively. The scanning apparatus also has the transmission apparatus, the light source, the photoelectric sensing device and the control processing unit inside the casing. The transmission apparatus includes the feeding roller for driving the small-sized document. The light source is emitting the light for scanning the small-sized document. The photoelectric sensing device is situated close to the light source for receiving a light signal reflected by the small-sized document and then outputting a digital data of captured image to the control processing unit. The transmission apparatus further includes a spring and a damping. When energy accumulated in the spring is released, the feeding roller is rotated and the small-sized document is delivered into the scanning apparatus. The damping is connected to the spring for controlling the rotation rate of the feeding roller. The cap is designed for covering the input slot and the output slot and functions as a dust cover. The scanning apparatus also has an interface connector on the casing. Through the interface connector such as 1394 connector or USB (Universal Serial Bus) connector, the digital data of captured image stored in the control processing unit can be transmitted to the terminal operating system, such as the computer, the Personal Digital Assistant (PDA) and the cellular phone, and be edited or printed further.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

The scanning apparatus with appearance of a pen of the invention is used for scanning the small-sized documents, especially the business cards. The objective of the invention, which is portable and easy to carry, is achieved by integrating the scanner with the pen-shaped casing.

Example 1

Figure 1:
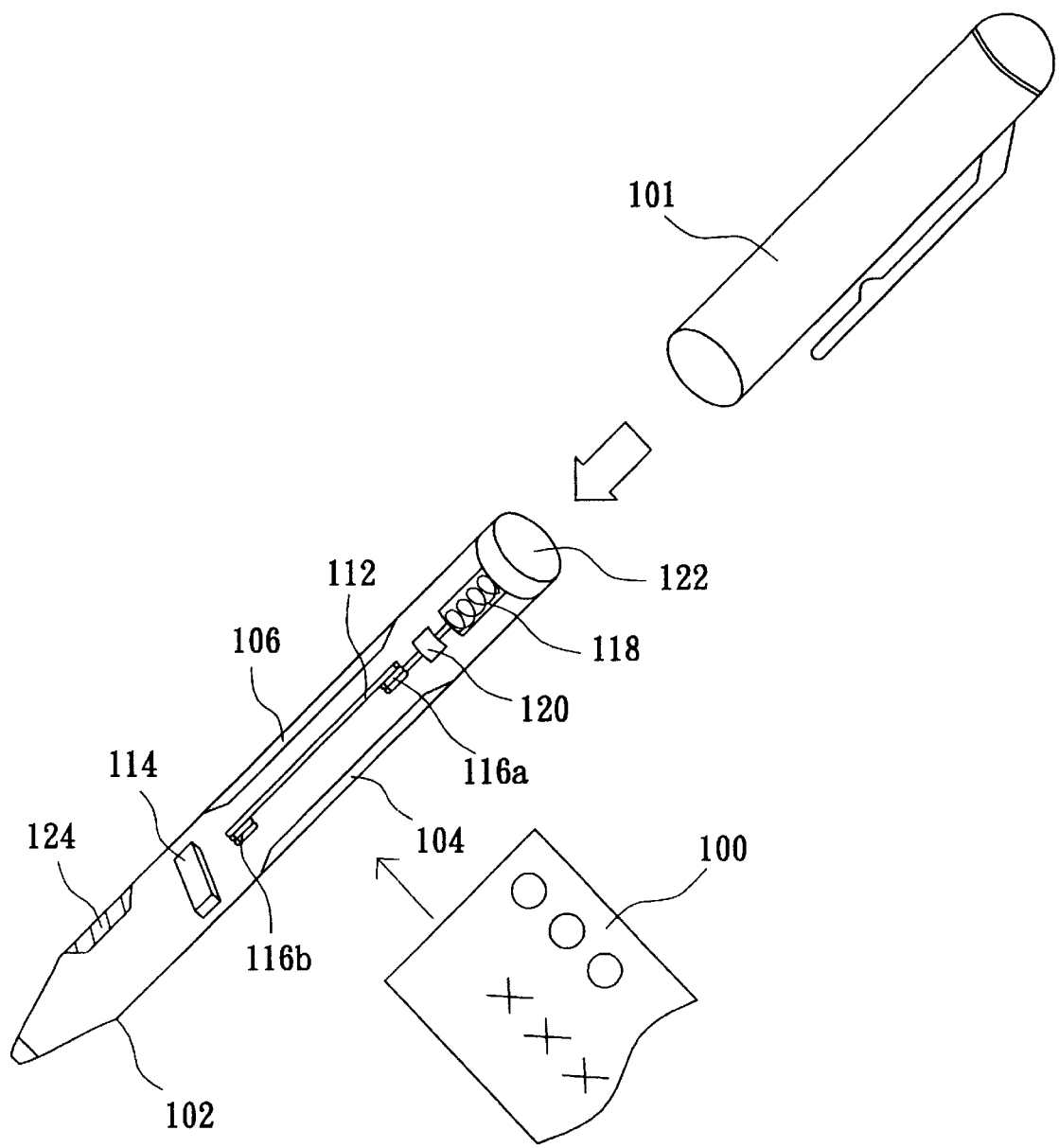
FIG. 1 depicts a perspective drawing of the scanning apparatus with the appearance of a pen according to the first embodiment of the invention.

Referring to FIG. 1, which depicts a perspective drawing of the scanning apparatus with the appearance of a pen according to the first embodiment of the invention. The scanning apparatus with the appearance of a pen is used for scanning the small-sized documents 100, such as the business cards, the pictures, or the photos. The scanning apparatus according to the invention includes the cap 101, the casing 102, the input slot 104 on the one side of the casing 102 for inputting the to-be scanned small-sized documents 100, and the output slot 106 on the other side of the casing 102 for outputting the small-sized documents 100. Inside the casing 102, the scanning apparatus further includes the transmission apparatus, the light source, and the photoelectric sensing device 112. The transmission apparatus, such as the feeding rollers 116a and 116b, drives the small-sized documents 100 into the scanning apparatus, and the light source (not shown in FIG. 1) provides the light for scanning the small-sized documents 100. The photoelectric sensing device 112 receives the light signal reflected from the small-sized documents 100 and converts the light signal into the electric signal, and then transmits the digital data of the scanning image to the control processing unit 114. In the first embodiment, the transmission apparatus also includes the spring 118 and the damping 120. The energy accumulated in the spring 118 can be released to drive the feeding rollers 116a and 116b for transmitting the small-sized documents 100 into the scanner. The damping 120 connected to the spring 118 damps the rate of energy release of the spring 118, so that the rotation speed of the feeding rollers 116a and 116b can be controlled and maintained in the constant rate. Additionally, the battery 122 is placed in the end of the scanning apparatus, and be the power source of the scanning apparatus.

The scanning apparatus according to the invention also has an interface connector 124 on the casing 102, such as the 1394 connector or the USB (Universal Serial Bus) connector. The digital data stored in the control processing unit 114 can be transmitted to a terminal operating system via the interface connector 124, and then be edited, printed, or arranged in order. The terminal operating system can be the electronic products such as the computer, PDA, or cellular phone.

Figure 2:
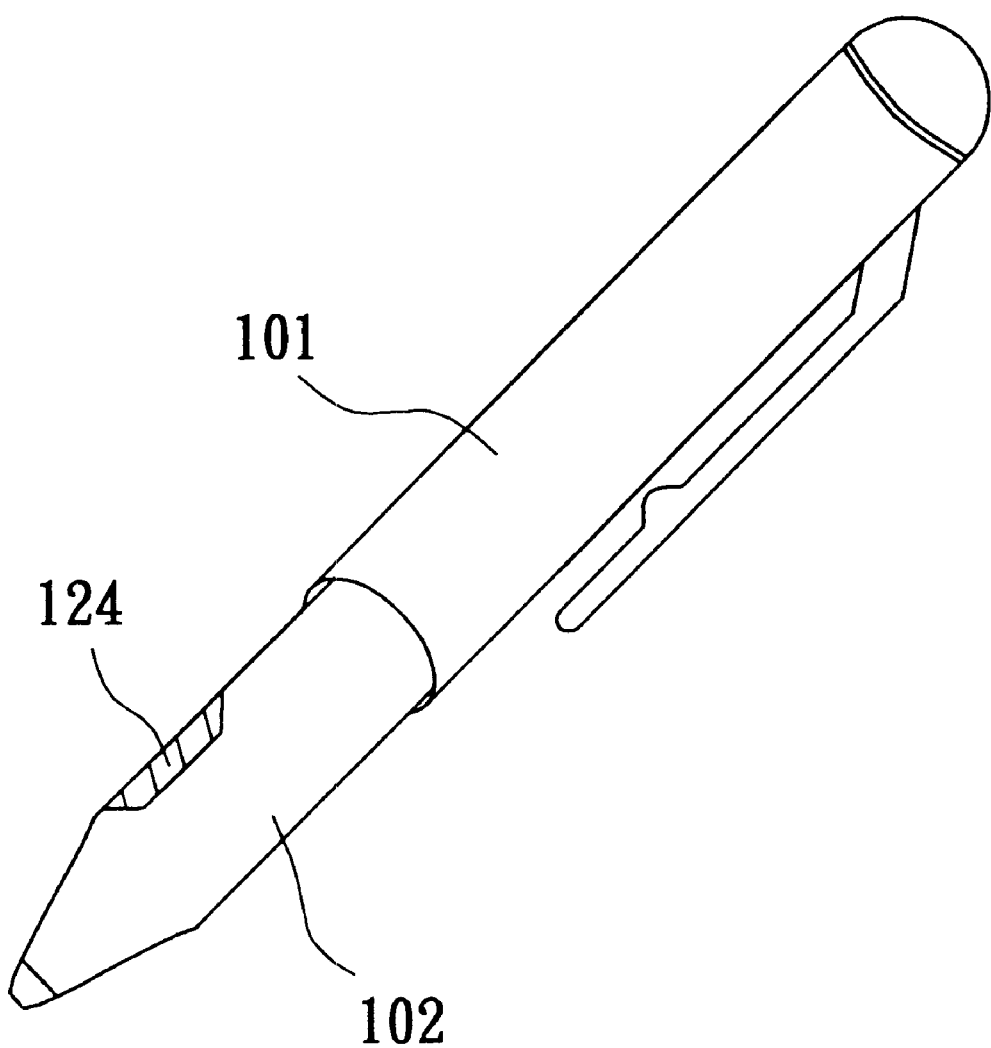
FIG. 2 depicts the casing covered with the cap of FIG. 1.

Referring to FIG. 2, which depicts the casing covered with the cap of FIG. 1. The cap 101 functions as a dust cover. When the scanning apparatus is not used, the casing 102 is covered with the cap 101 and the input slot 104 and the output slot 106 are totally shielded to prevent the scanning apparatus from the dust, as show in FIG. 2. When the scanning apparatus is to be operated, the cap 101 is removed from the casing to expose the input slot 104 and the output slot 106, and then the scanning procedure is ready to proceed.

Figure 3:
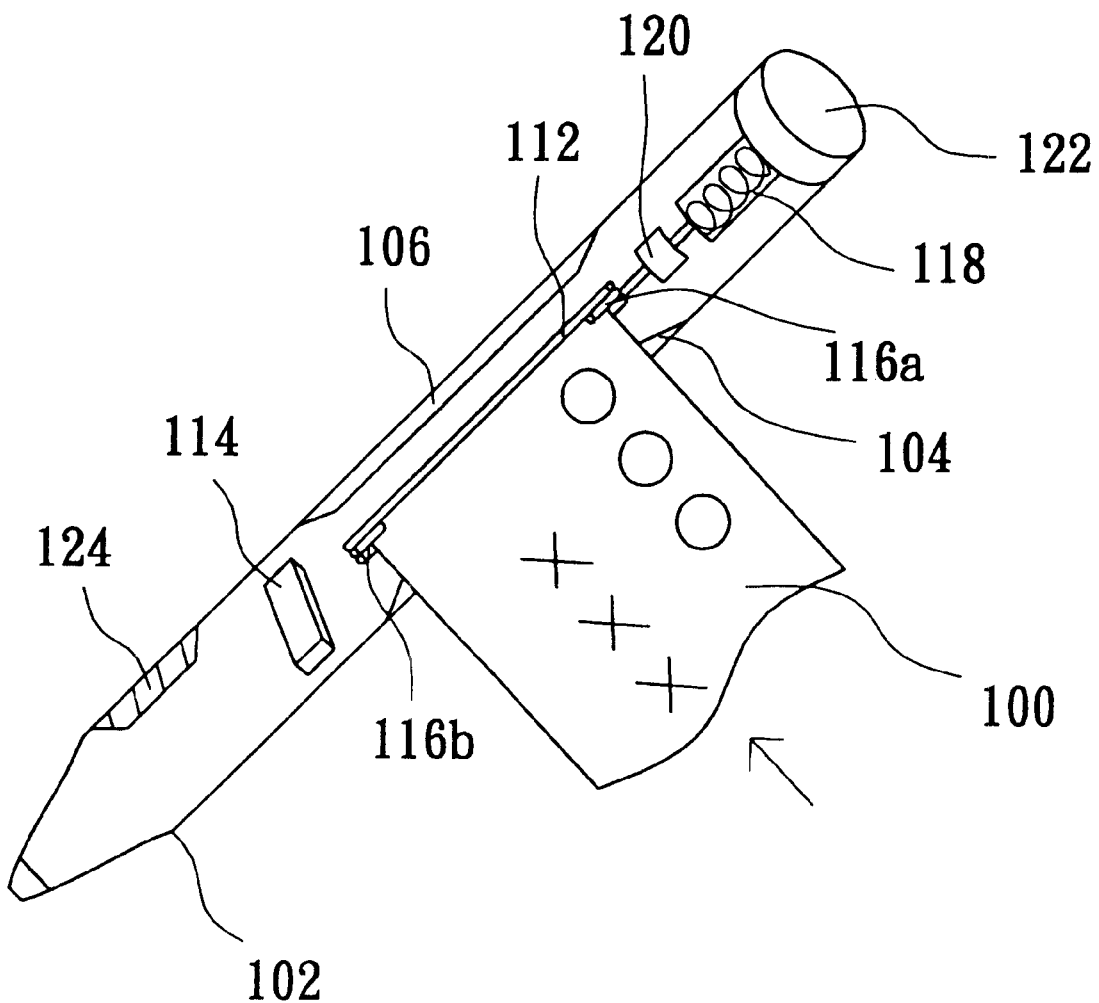
FIG. 3 depicts the operation of the scanning apparatus with the appearance of the pen of FIG. 1.

Referring to FIG. 3, which depicts the operation of the scanning apparatus with the appearance of the pen of FIG. 1. Before scanning the small-sized document 100, the spring 118 is deformed and compressed to accumulate the energy therein. Then, the small-sized document 100 is inserted to the input slot 104 and clipped by the feeding rollers 116a and 116b due to friction. Next, the spring 118 is unloosened to release the energy, so that the feeding rollers 116a and 116b are driven and the small-sized document 100 is simultaneously forwarded into the scanning apparatus. The damping 120, connected to the spring 118, is designed for controlling the rotation speed of the feeding rollers 116a and 116b due to the capability of damping the energy-releasing rate of the spring 118. Therefore, the small-sized document 100 is transmitted into the scanning apparatus at the constant rate, and the time of exposure can be set at a fixed value. In the first embodiment, it is power-saving by the way of accumulating energy in the spring 118 to drive the feeding rollers without power consumption.

The light source (not shown in FIG. 3), such as Light Emitting Diode (LED), situated inside the casing 102 and below the feeding rollers 116a and 116b, provides the light for scanning the small-sized document 100. Additionally, the photoelectric sensing device 112, such as Charged Coupled device (CCD) or Contact Image Device (CIS), is closely situated below the light source to receive the light signal reflected from the small-sized document 100 and converts the light signal into the electric signal, then, transmits the digital data of the scanning image to the control processing unit 114. The control processing unit 114 consists of the control circuit and the storage device, which the storage device is the device for storing the digital data of scanning image such as random-access memory (ram). After finishing the scanning, the small-sized document 100 completely comes out from the output slot 106.

If the scanning apparatus of the invention only has one set of the light sources and the photoelectric sensing device 112, it merely scans the single side of the small-sized document 100 at each run. However, some of the small-sized documents 100, especially the business cards, are two-sided, and the users have to scan twice for capturing the front and back images of the documents. Therefore, it will promote the user's convenience that two sets of the light sources and the photoelectric sensing device 112 are situated oppositely in the scanning apparatus and the images of the two-sided document can be captured simultaneously.

Furthermore, it should be understood that the positions and the sizes of the input slot 104 and the output slot 106 are not limited. However, the sizes should be at least larger than the short side of the business card, and the positions should be determined in accordance with the rotating direction of the feeding rollers 116a and 116b for smoothly driving the business card.

In the first embodiment, it is the power source to driving the feeding rollers 116a and 116b that the energy accumulated in the compressed spring 118 by means of twisting. Also, the damping 120 is used for controlling the energy-releasing rate of the spring 118 to make the feeding rollers 116a and 116b rotate at the constant speed. Consequently the time of exposure can be determined and set as a fixed value corresponding to the rotation rate of the feeding rollers 116a and 116b. However, there is another way to drive the feeding rollers 116a and 116b rotating at the constant speed, for example driven by a motor.

Example 2

Figure 4:
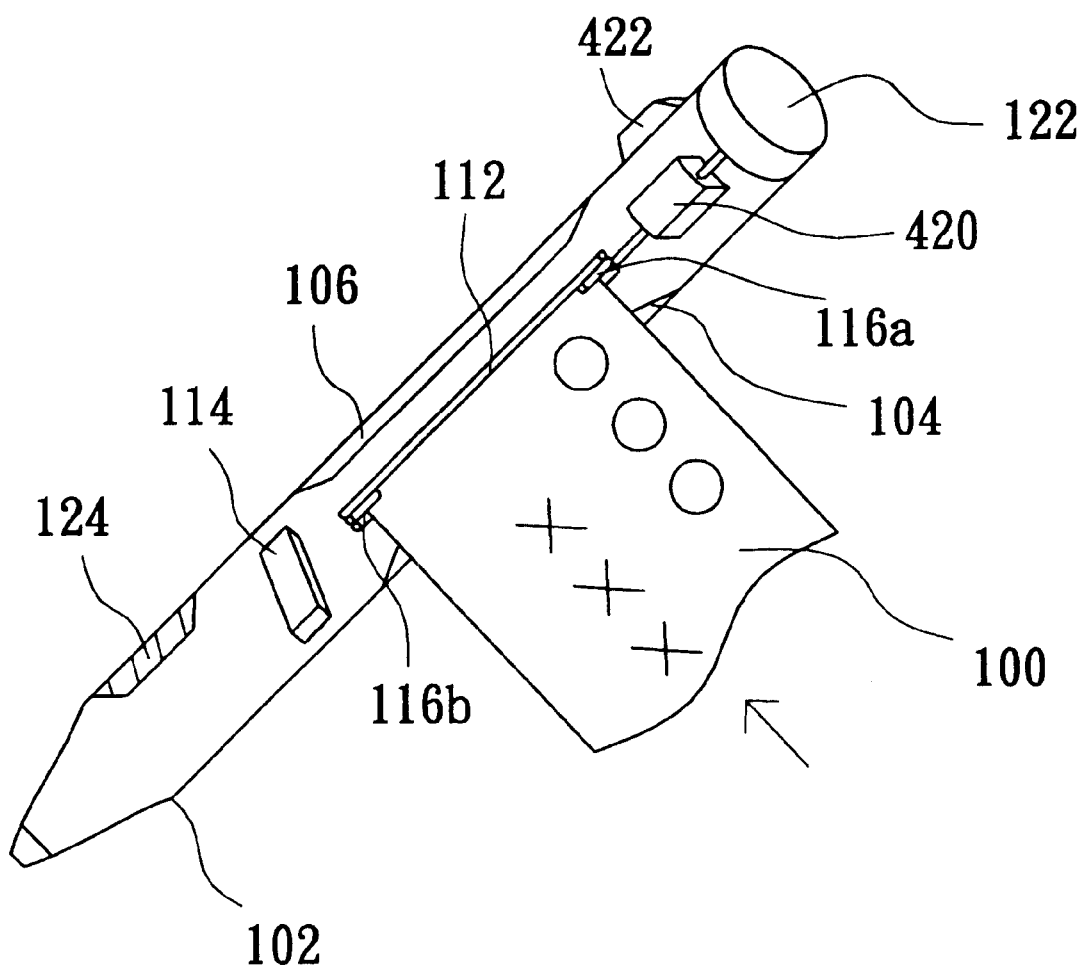
FIG. 4 depicts a perspective drawing of the scanning apparatus with the appearance of a pen according to the second embodiment of the invention.

Referring to FIG. 4, which depicts a perspective drawing of the scanning apparatus with the appearance of a pen according to the second embodiment of the invention. The main difference between the first and the second embodiments is the spring 118 and the damping 120 of FIG. 3 replaced by a motor, such as a mini-motor 420. In FIG. 4, the battery 122, where is placed in the end of the scanning apparatus, is electrically connected to the mini-motor 420 for providing the electric power of the scanning apparatus. Additionally, a power switch 422 is set on the casing 102 for switching on or switching off the mini-motor 420.

When the small-sized document 100 is to be scanned, it is inserted to the input slot 104 and clipped by the feeding rollers 116a and 116b due to the friction. Then, switch on the mini-motor 420 to drive the feeding rollers 116a and 116b rotating at the constant speed, so that the small-sized document 100 is simultaneously forwarded into the scanning apparatus. Because the mini-motor 420 rotates at the constant speed, the time of exposure can be determined as a fixed value. The other devices in the scanning apparatus and the steps to accomplish the scan are the same as described in the first embodiment (FIG. 3). After completing the scan of the small-sized document 100, press the power switch 422 to turn off the mini-motor 420. Additionally, a power terminal, which is electrically connected to the mini-motor 420, is further set on the casing 102 (not shown in FIG. 4), and can provide the power to the scanning apparatus while connecting to the external power source.

In the aforementioned embodiments, the photoelectric sensing device 112 of the scanning apparatus with the appearance of the pen could be CCD or CIS. The image captured and digitalized by CCD is sharper and has the greater depth of field than CIS. Also, the CCD scanner offering consistent scanning quality has longer scanner life and higher resolution than the CIS scanner. However, many components have to be included in CCD for producing the high-quality image, such as the lens and the reflectors, and that consequently increases the size and cost. Integration of CIS scanning functions reduces the space needed for other components, allowing CIS scanners to be thinner and lighter than their CCD counterparts. Considering the factors of the cost, the size, and the resolution needed for scanning the business card, CIS is good enough for being chosen as the photoelectric sensing device 112 of the invention, liner CIS especially.

As to the material of the casing 102, it could be made of plastics, rubbers, or metals such as alloy of magnesium (Mg) and aluminum (Al) for making the scanning apparatus pleasing, light, and easy to carry. As to the material of the cap 101, it could be the same as the casing 102 to achieve the unity of vision, or could be not the same to create the aesthetic feeling of disharmony. It should be understood that the material of the cap 101 and the casing 102 are not limited anyhow. The objective of the cap 101 is to cover the casing 102 and functions as dust cover of the scanning apparatus.

In the preferred embodiments described herein, the advantages of the scanning apparatus with the appearance of the pen according to the invention are summarized as follows:

1. By integrating the simple mechanism into the casing with the appearance of the pen, the scanning apparatus can be put in the pocket just as a real pen, and operated anywhere and anytime.
2. The information on the business cards stored in the elaborated scanning apparatus as digital format can be transmitted to the terminal operating systems such as computers or PDA. By reading the data on the terminal operating systems instead of on the paper, the paper pollution of the environment is decreased.
3. It is power saving that energy is accumulated in the spring 118 by twisting to drive the feeding rollers without consuming power.
4. The cap 101 makes the scanning apparatus dust-proof.
5. The casing 102 made of plastics, rubbers, or metals such as an alloy of magnesium (Mg) and aluminum (Al), make the scanning apparatus pleasing, light, and easy to carry.
6. It is time-saving to scan the two-sided documents if two sets of the light source and the photoelectric sensing device 112 are installed in the scanning apparatus.

While the invention has been described by way of examples and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanning apparatus with the appearance of a pen for scanning a small-sized document, comprising:
   a casing, comprising:
      an input slot situated on the casing for inputting the small-sized document;
      an output slot situated on the casing for outputting the small-sized document;
      a transmission apparatus for driving the small-sized document;
      a light source situated inside the casing;
      a photoelectric sensing device situated close to the light source for receiving a light signal reflected by the small-sized document and then outputting a digital data of captured image;
      a control processing unit for controlling the photoelectric sensing device and storing the digital data of captured image; and
      an interface connector for transmitting the digital data of captured image to a terminal operating system; and
   a cap for covering the input slot and the output slot.

2. The scanning apparatus with the appearance of a pen according to claim 1, wherein the transmission apparatus has a feeding roller to drive the small-sized document into the scanning apparatus.

3. The scanning apparatus with the appearance of a pen according to claim 2, wherein the transmission apparatus further has a spring for accumulating energy, and the feeding roller is rotated when energy is released.

4. The scanning apparatus with the appearance of a pen according to claim 3, wherein the transmission apparatus further has a damping connected to the spring for controlling the rotation rate of the feeding roller.

5. The scanning apparatus with the appearance of a pen according to claim 1, wherein the transmission apparatus further has a motor for driving the feeding roller.

6. The scanning apparatus with the appearance of a pen according to claim 2, wherein the scanning apparatus further has a battery as a power source.

7. The scanning apparatus with the appearance of a pen according to claim 1, wherein the scanning apparatus further has a power terminal connected to the external power source to provide the power of the scanning apparatus.

8. The scanning apparatus with the appearance of a pen according to claim 1, wherein the light source is Light Emitting Diode (LED).

9. The scanning apparatus with the appearance of a pen according to claim 1, wherein the photoelectric sensing device is a Contact Image Sensor (CIS).

10. The scanning apparatus with the appearance of a pen according to claim 9, wherein the CIS is linear.

11. The scanning apparatus with the appearance of a pen according to claim 1, wherein the control processing unit has a random-access memory.

12. The scanning apparatus with the appearance of a pen according to claim 1, wherein the interface connector is a 1394 connector.

13. The scanning apparatus with the appearance of a pen according to claim 1, wherein the interface connector is a USB (Universal Serial Bus) connector.

14. The scanning apparatus with the appearance of a pen according to claim 1, wherein the terminal operating system is a computer for editing or printing the digital data of captured image.

15. The scanning apparatus with the appearance of a pen according to claim 1, wherein the terminal operating system is a Personal Digital Assistant (PDA) for editing or printing the digital data of captured image.

16. The scanning apparatus with the appearance of a pen according to claim 1, wherein the casing is made of an alloy of magnesium (Mg) and aluminum (Al).

17. The scanning apparatus with the appearance of a pen according to claim 1, wherein the casing is made of plastic.

18. The scanning apparatus with the appearance of a pen according to claim 1, wherein the casing is made of rubber.

19. The scanning apparatus with the appearance of a pen according to claim 1, wherein the small-sized document is a business card.

* * * * *